United States Patent [19]
Onodera et al.

[11] Patent Number: 5,009,513

[45] Date of Patent: Apr. 23, 1991

[54] METHOD OF MEASURING QUANTITY OF HEAT APPLIED TO OPTICAL FIBER

[75] Inventors: Tsutomu Onodera; Takeshi Yamada, both of Sakura, Japan

[73] Assignee: Fujikura Ltd., Tokyo, Japan

[21] Appl. No.: 572,343

[22] Filed: Aug. 23, 1990

Related U.S. Application Data

[63] Continuation of Ser. No. 283,228, Dec. 12, 1988, abandoned.

[30] Foreign Application Priority Data

Dec. 16, 1987 [JP] Japan ............................ 62-318435

[51] Int. Cl.$^5$ ................. B65H 69/08; G01K 17/00; G02B 6/255
[52] U.S. Cl. ................................ 374/31; 156/158; 219/201; 350/96.21; 374/131
[58] Field of Search ............... 374/31, 131, 32, 29, 374/142; 350/96.15, 96.21; 219/121.45, 121.63; 156/158

[56] References Cited

U.S. PATENT DOCUMENTS

| | | | |
|---|---|---|---|
| 3,928,102 | 12/1975 | Rowe et al. | 350/96.15 X |
| 4,008,061 | 2/1977 | Ramsay | 350/96.15 X |
| 4,054,366 | 10/1977 | Barnoski et al. | 350/96.15 |
| 4,083,625 | 4/1978 | Hudson | 350/96.15 |
| 4,291,940 | 9/1981 | Kawasaki et al. | 350/96.21 X |
| 4,747,698 | 5/1988 | Wickramasinghe et al. | 374/6 |
| 4,793,715 | 12/1988 | Kasner et al. | 374/6 |

OTHER PUBLICATIONS

Technical Research Report on the Institute of Electronics and Communications OQE75-88-94 pp. 25-32, 12/13/75.
Patent Abstracts of Japan, vol. 9, No. 13 (P-328) [1736], Jan. 19, 1985; & JP-A-59 160 113 (Nippon Denshin Denwa Kosha) 10-09-1984.

Primary Examiner—Daniel M. Yasich
Attorney, Agent, or Firm—Frishauf, Holtz, Goodman & Woodward

[57] ABSTRACT

In a method of measuring a quantity of heat, the distance between the position of an end of an exposed fiber portion before heating and the position of the end after heating is measured, and the quantity of heat applied to the end of the exposed fiber portion is calculated based on the distance. When heat is applied to an end of an exposed fiber portion, the end is fused and is rounded due to surface tension. For this reason, the position of the end of the exposed fiber portion retracts from the position it occupied before heating by the volume required for rounding the end. This retraction amount corresponds to a quantity of heat applied to the end of the exposed fiber portion. Therefore, by meauring the retraction amount, the quantity of heat applied to the ends of the exposed fiber portion can be quantitatively measured.

9 Claims, 14 Drawing Sheets

METHOD OF MEASURING QUANTITY OF HEAT APPLIED TO OPTICAL FIBER

This application is a Continuation of application Ser. No. 07/283,228 filed Dec. 12, 1988.

BACKGROUND OF THE INVENTION

1. Field of the Invention

The present invention relates to a method of measuring a quantity of heat applied to the end of an exposed fiber portion of an optical fiber, in particular, to a method of measuring a quantity of heat applied to the ends of exposed fiber portions of a ribbon optical fiber.

2. Description of the Related Art

In fusion-splicing of a pair of ribbon optical fibers, the exposed fiber portions of the ribbon optical fibers are simultaneously fusion-spliced. Therefore, it is important to know the quantity of heat applied to the end of each exposed fiber portion of the ribbon optical fibers.

According to a technique for measuring a quantity of heat, a discharge arc for fusion-splicing is picked up by a TV camera, and a quantity of heat is calculated on the basis of luminance distribution of the arc. That is, in this technique, a quantity of heat applied to the end of each exposed fiber portion is measured not directly but indirectly, or in other words, not quantitatively, but qualitatively. Therefore, the quantity of heat applied to the end of the exposed fiber portion cannot be measured accurately.

Furthermore, since measurement of the luminance distribution is provided by analyzing an arc image picked up by a TV camera, a frame memory and a large-capacity image processor for processing one-frame data are required, resulting in a bulky system and time-consuming processing.

SUMMARY OF THE INVENTION

It is an object of the present invention to provide a method of quantitatively, and easily measuring a quantity of heat applied to the end of an exposed fiber portion of an optical fiber.

In the present invention, the distance between the position of one end of an exposed fiber portion before heating and the position of the same end after heating is measured, and the quantity of heat applied to the end of exposed fiber portion is determined based on this distance.

According to the present invention, there is provided a method for measuring a quantity of heat applied to an end of an exposed fiber portion of a single optical fiber or ends of exposed fiber portions of a ribbon optical fiber, comprising the steps of measuring distance or distances between an end or ends of an exposed fiber portion or portions of an optical fiber before heating and the end or ends of the exposed fiber portion or portions after heating, and determining the quantity or quantities of heat applied to the end or ends of the exposed fiber portion or portions based on the measured distance or distances.

According to the present invention, there is further provided a method for measuring a quantity of heat applied to an end of an exposed fiber portion of each of a pair of single optical fibers arranged in a line or ends of exposed fiber portions of each of a pair of ribbon optical fibers arranged in a line, comprising the steps of measuring distance or distances between an end or ends of an exposed fiber portion or portions, before heating, of each of a pair of optical fibers arranged in a line and the end or ends of the exposed fiber portion or portions after heating, and determining the quantity or quantities of heat applied to the end or ends of the exposed fiber portion or portions of each optical fiber based on the measured distance or distances.

When heat is applied to an end of an exposed fiber portion, the end is fused and is rounded due to surface tension. For this reason, the position of the end of the exposed fiber portion retracts from the position it occupied before heating, according to the volume required for rounding of the end.

This retraction amount corresponds to the quantity of heat applied to the end of the exposed fiber portion. Therefore, by measuring the amount of retraction, the quantity of heat applied to the end of an exposed fiber portion can be quantitatively measured.

DETAILED DESCRIPTION OF THE PREFERRED EMBODIMENTS

A method of measuring a quantity of heat applied to the end of each exposed fiber portion of an optical fiber according to an embodiment of the present invention will be described hereinafter. This embodiment refers to ribbon optical fibers.

Figure 1:
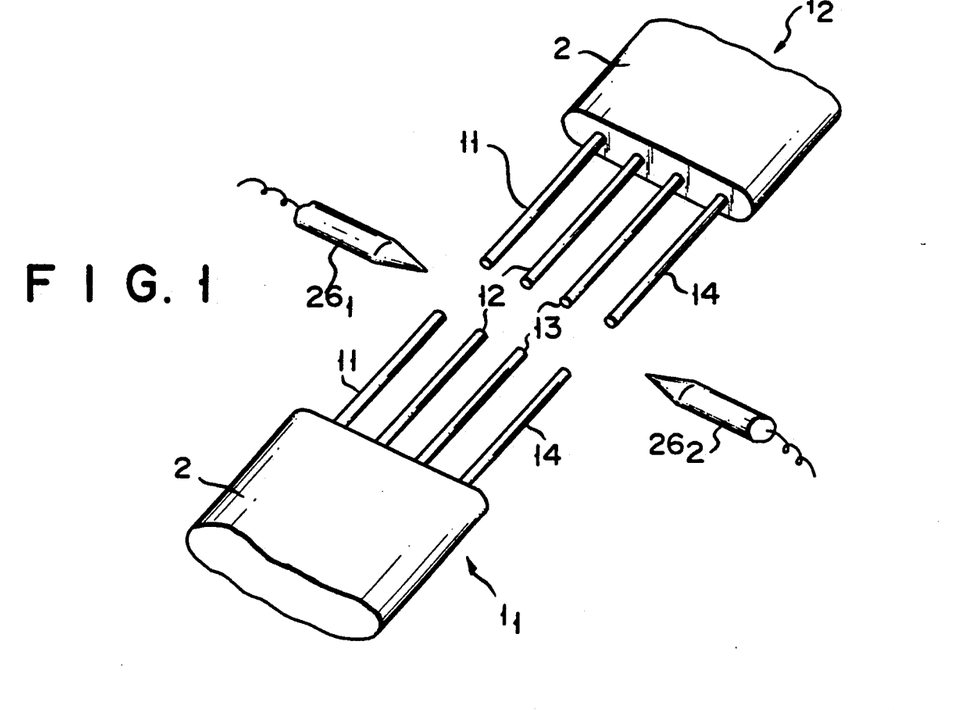
FIG. 1 is a perspective view of a pair of ribbon optical fibers and discharging electrodes for applying an arc to the ends of exposed fiber portions of the ribbon optical fibers.

Referring to FIG. 1, ribbon optical fibers $1_1$ and $1_2$ each have a tape-like shape, and each comprise parallel exposed fiber portions 11 to 14. Exposed fiber portions 11 to 14 are cut to a predetermined length so that their ends are aligned.

Figure 2:
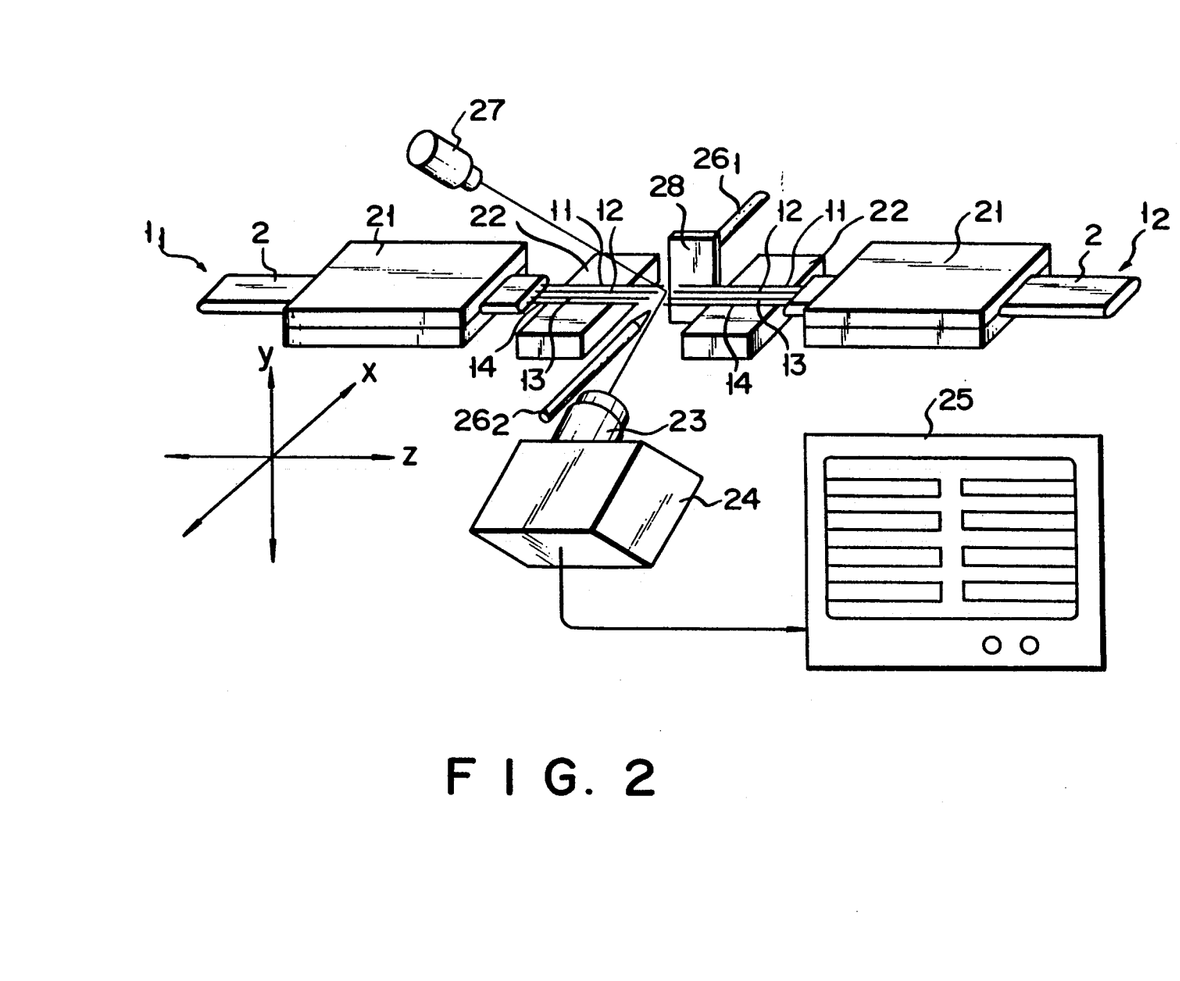
FIG. 2 is a perspective view of an apparatus for fusion-splicing ribbon optical fibers.
Figure 3:
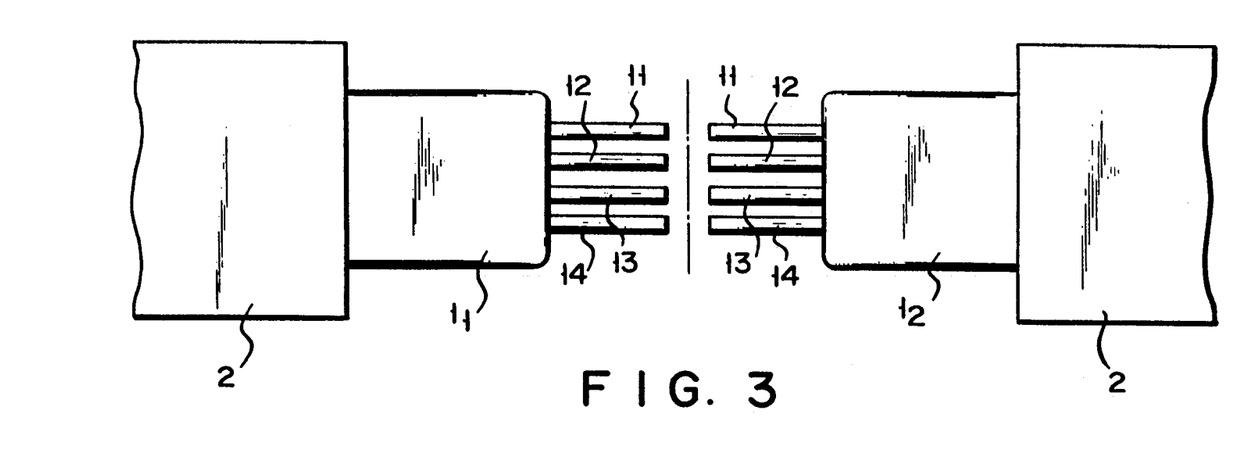
FIGS. 3 to 6 show a pair of ribbon optical fibers at respective steps for fusion-splicing the fibers.
Figure 4:
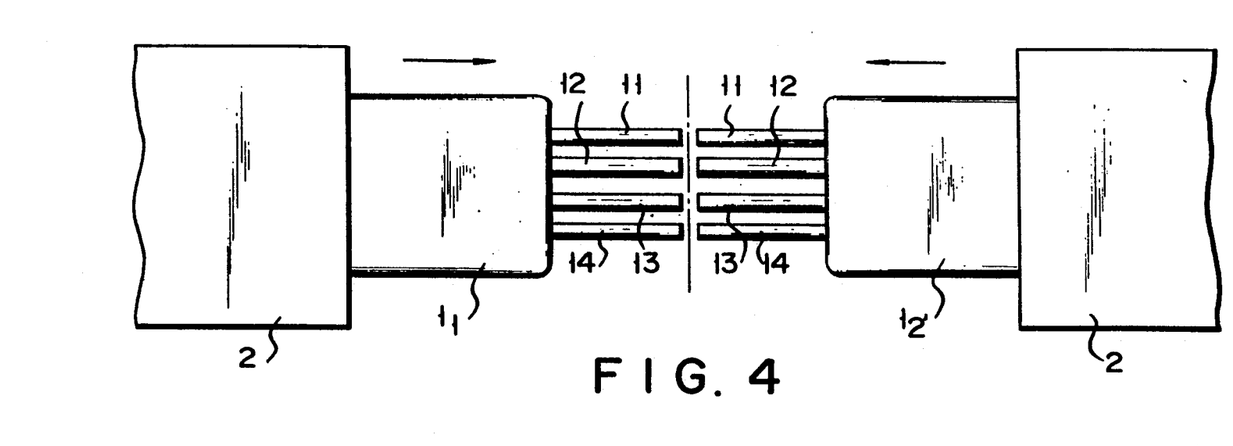
Figure 5:
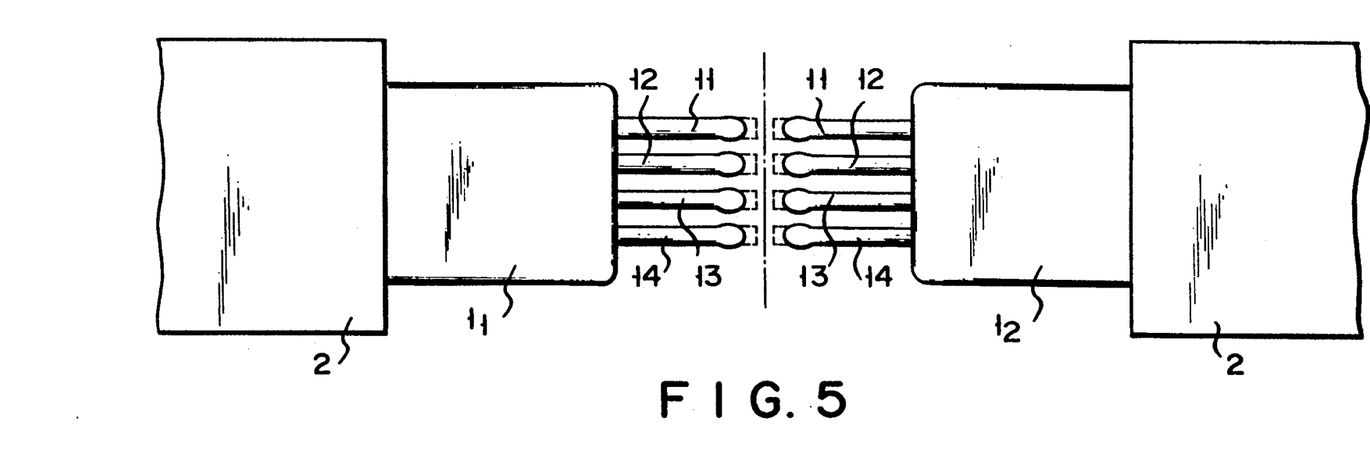
Figure 6:
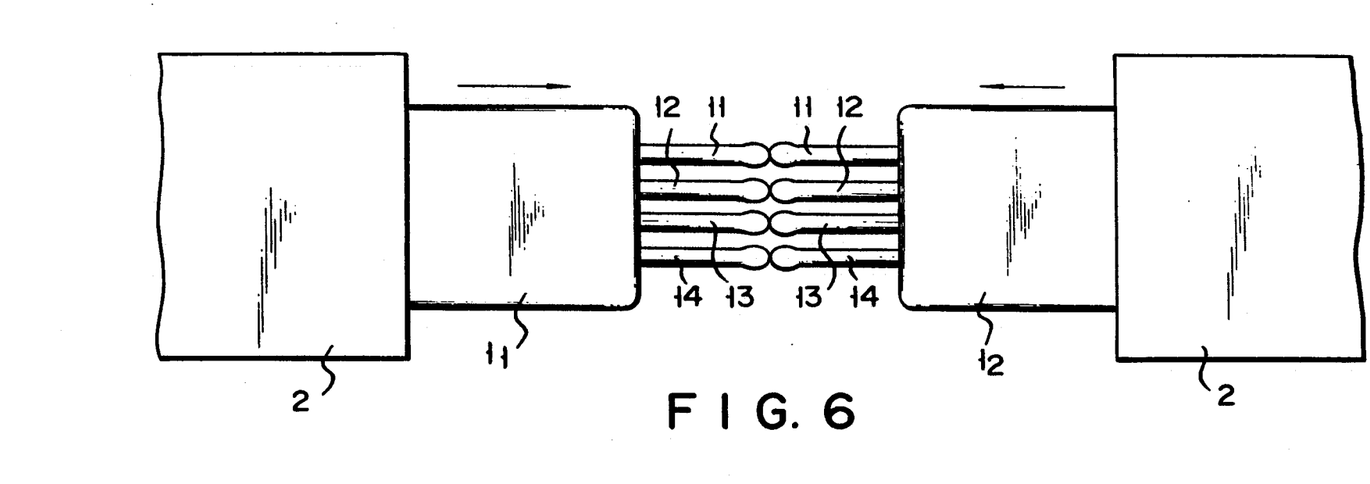

To fusion-splice the exposed fiber portions 11 to 14 of optical fibers $1_1$ and $1_2$, jacketed portion 2 of each optical fiber is clamped by adapter 21, as shown in FIG. 2. Adapter 21 is accommodated in a guide groove (not shown) formed in the body (not shown) of the apparatus. Exposed fiber portions 11–14 of each optical fiber are set in V-grooves (not shown) of V-groove block 22 mounted on the apparatus body, so that, as shown in FIG. 3, the end faces of exposed fiber portions 11–14 of one optical fiber $1_1$ are opposed to the end faces of exposed fiber portions 11–14 of the other optical fiber $1_2$. It is unnecessary to perform centering of the exposed fiber portions 11–14 in x and y directions. This is why V-groove blocks 22 are made integral (though blocks 22 are shown as separate components in FIG. 2), and V-grooves thereof are substantially exactly aligned. Specifically, V-groove blocks 22 are provided by first forming straight V-grooves on a common block, and then forming on the block a shallow recess extending across the V-grooves s that integral V-groove blocks 22 are formed. Since, in this way, V-groove blocks 22 are integrally or continuously formed, V-grooves of both V-groove blocks 22 consequently substantially align with each other. Therefore, the optical fibers set in the V-grooves of both V-groove blocks 22 are aligned in x and y directions when the exposed fiber portions are set in the V-grooves. Thus, centering of the exposed fiber portions in x and y directions is unnecessary to be performed. Adapters 21 are then moved in z direction (FIG. 2), so that, as shown in FIG. 4, an initial interval is set between the exposed fiber portions 11–14 of optical fiber $1_1$, and the exposed fiber portions 11–14 of optical fiber $1_2$, while monitoring the ends of the exposed fiber portions 11–14 of the optical fibers $1_1$ and $1_2$ by a direct monitoring method using microscope 23, TV (television) camera 24, and TV monitor 25 (FIG. 2). Then, an arc is applied via discharge electrodes $26_1$ and $26_2$ to the ends of the exposed fiber portions 11–14 of optical fibers $1_1$ and $1_2$ (FIG. 2), so that the end faces of the exposed fiber portions are fused. When the end faces of the exposed fiber portions 11–14 are fused, adapters 21 are further moved in z direction (FIG. 2), so that, as shown in FIG. 6, the end faces of the exposed fiber portions 11–14 abut against each other, while applying an arc to the ends of the exposed fiber portions 11–14. In this way, the exposed fiber portions of ribbon optical fibers are fusion-spliced.

The application of arc to the ends of the exposed fiber portions 11–14 can be performed, while moving the exposed fiber portions 11–14 in z direction so that fiber portions 11–14 abut against each other.

Figure 7:
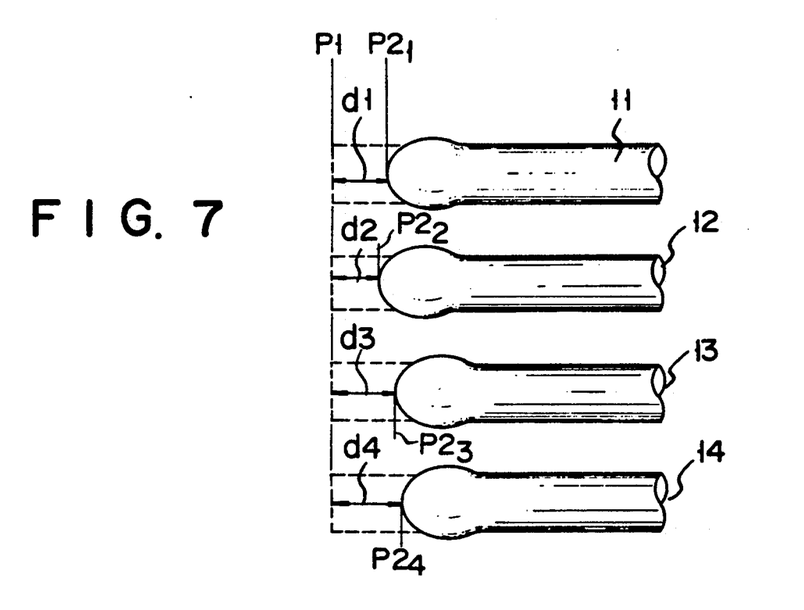
FIG. 7 is a view showing exposed fiber portions of a ribbon optical fibers, in which ends of the exposed fiber portions of the fibers are rounded by an arc.

When the ends of exposed fiber portions 11 to 14 are heated, the ends are rounded by surface tension, as shown in FIG. 7. Consequently, the ends of exposed fiber portions 11 to 14 retract from the original position P1, i.e., the position before heating, to positions $P2_1$, $P2_2$, $P2_3$, and $P2_4$, respectively, by volumes required for deformation into the round shape. In other words, the overall length of exposed fiber portions $11_1$ to $11_4$ are shortened by the volumes required for deformation into the round shape.

In FIG. 7, d1 denotes the distance between positions P1 and $P2_1$. d2, d3, and d4 denote the distance between positions P1 and $P2_2$, the distance between positions P1 and $P2_3$, and the distance between positions P1 and $P2_4$, respectively.

To know distances d1, d2, d3, and d4, position P1, which is the position of the ends of the exposed fiber portions before heating, is first picked up on the monitor screen when the initial distance between the ends of exposed fiber portions has been set. Also, to know distances d1, d2, d3, and d4, positions $P2_1$, $P2_2$, $P2_3$ and $P2_4$ are picked up on the monitor screen.

Distance d1 is known by subtracting position P1 from position $P2_1$. Distances d2, d3 and d4 are known by subtracting position P1 from position $P2_2$, by subtracting position P1 from position $P2_3$, and by subtracting position P1 from position $P2_4$, respectively.

When a quantity of heat applied to the end of each exposed fiber portion is large, the degree of roundness of the end of the exposed fiber portion increases, and the distance i.e., the retraction amount, also increases accordingly. That is, distances d1, d2, d3, and d4 correspond to quantities of heat applied to the ends of the exposed fiber portions 11, 12, 13, and 14, respectively. Therefore, quantities of heat applied to exposed fiber portions 11, 12, 13, and 14 can be known based on the distances d1, d2, d3, and d4 and the heat characteristics of the fibers.

If, distances d1, d2, d3, and d4, are equal to each other, quantities of heat applied to the ends of exposed fiber portions 11 to 14 are also equal to each other and consequently, the splice-strength of the spliced portions of the exposed fiber portions can be made uniform and can be increased.

Figure 8:
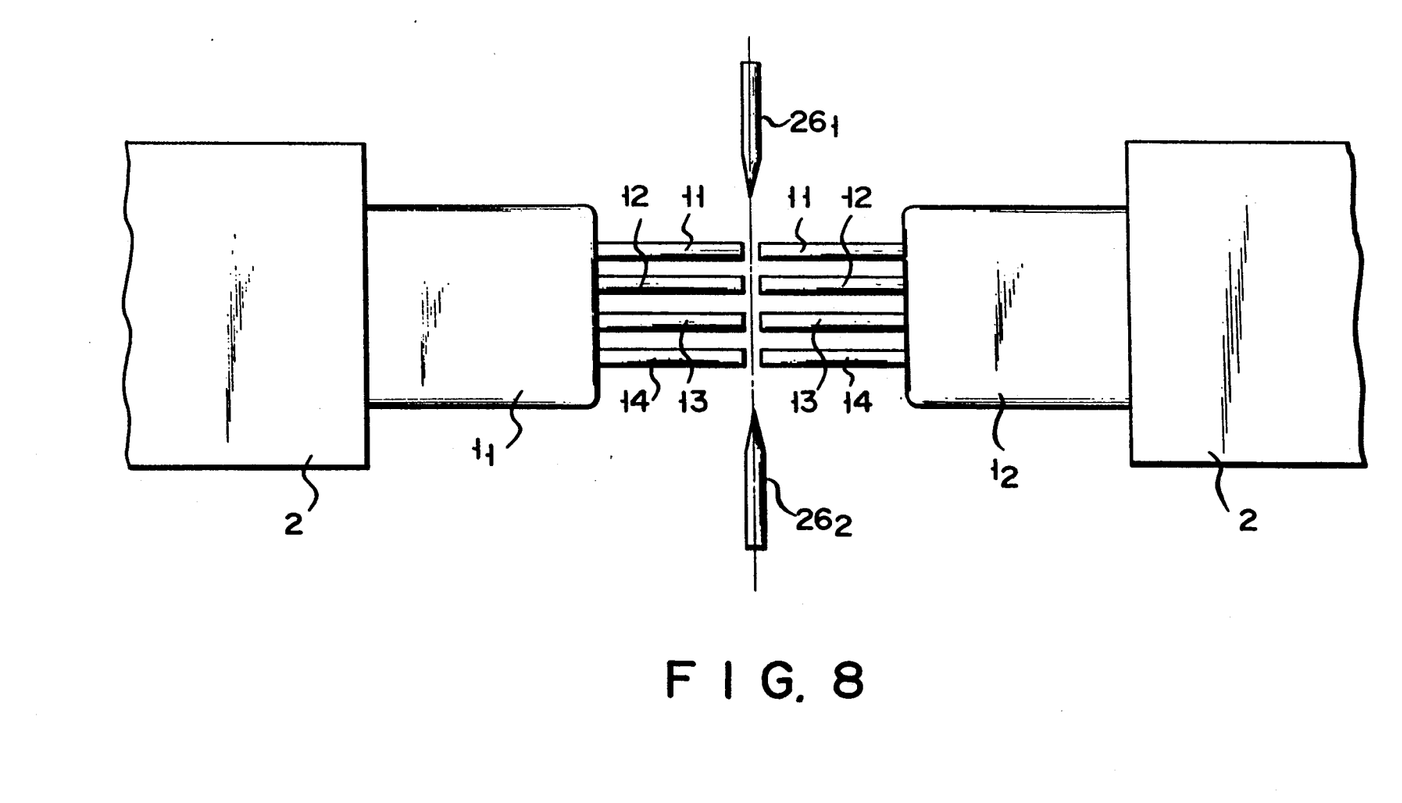
FIGS. 8 and 9 are views showing exposed fiber portions of a ribbon optical fiber before heating and after heating respectively.
Figure 9:
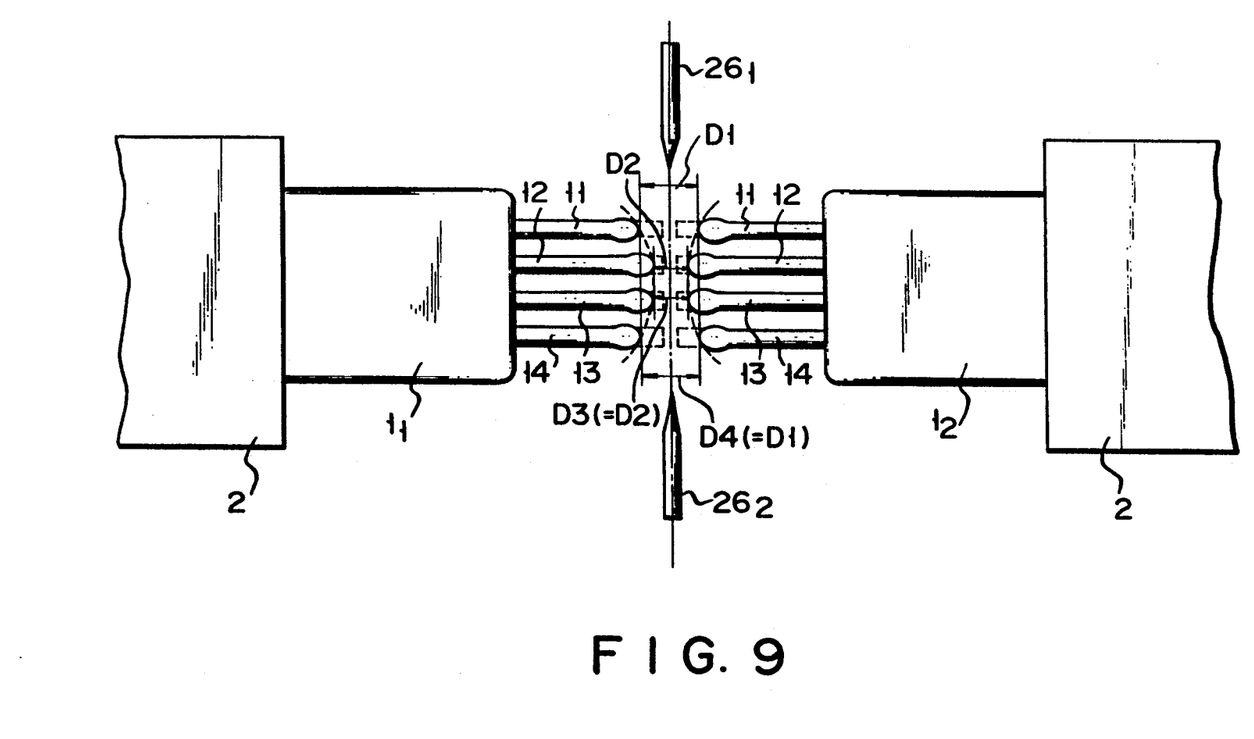

As shown in FIG. 8, when discharging electrodes $26_1$ and $26_2$ are arranged at the predetermined positions with regard to the exposed fiber portions 11–14 of the optical fibers $1_1$ and $1_2$ and an arc is applied to the ends of the optical fibers to heat the end faces thereof, then the pattern of the ends of the exposed fiber portions is as shown in FIG. 9. Distance D1 between the outer fiber portions 11 of the optical fibers $1_1$ and $1_2$ is substantially equal to distance D4 between the outer fiber portions 14 of the optical fibers $1_1$ and $1_2$. Distance D2 between the inner fiber portions 12 of the optical fibers $1_1$ and $1_2$ is substantially equal to distance D3 between the inner fiber portions 13 of the optical fibers $1_1$ and $1_2$.

Figure 10:
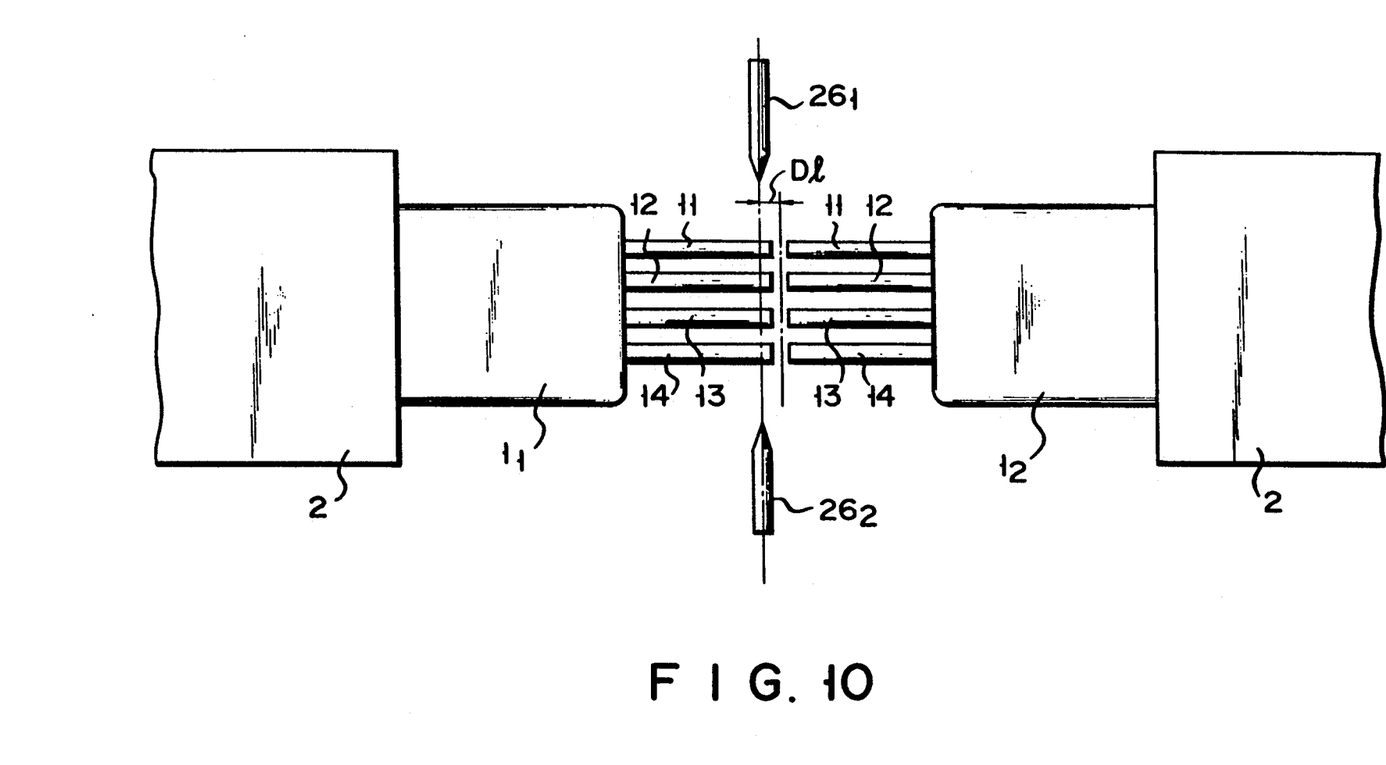
FIGS. 10 and 11 are views showing exposed fiber portions of a ribbon optical fiber before heating and after heating, respectively.
Figure 11:
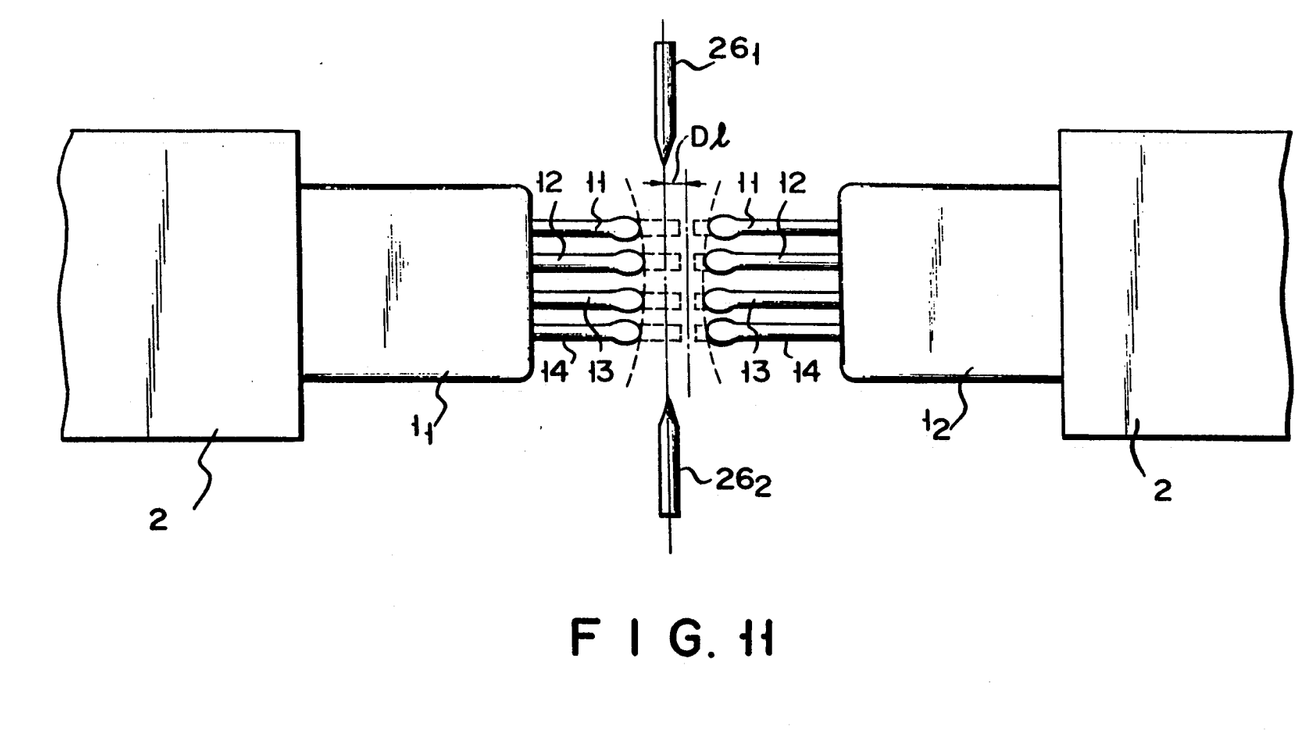

If, however, as shown in FIG. 10, discharging electrodes $26_1$ and $26_2$ are displaced from the predetermined positions by distance Dl closer to the exposed fiber portions of optical fiber $1_1$, and the arc then is applied to the ends of the exposed fiber portions of the optical fiber $1_1$ more strongly than those of optical fiber $1_2$, the ends of the exposed fiber portions of the optical fiber $1_1$ become rounder than those of optical fiber $1_2$. Therefore, the pattern of the ends of the exposed fiber portions 11–14 is as shown in FIG. 11. In this case, to make the retraction amounts of the corresponding fiber portions of the optical fibers $1_1$ and $1_2$ equal to each other, discharging electrodes $26_1$ and $26_2$ are moved toward the exposed fiber portions of the optical fiber $1_2$ by the distance Dl so that the electrodes are arranged at the predetermined positions. Alternatively, the optical fibers $1_1$ and $1_2$ are moved by the distance Dl so that the ends of the exposed fiber portions of optical fibers $1_1$ and $1_2$ are arranged at the predetermined positions.

Figure 12:
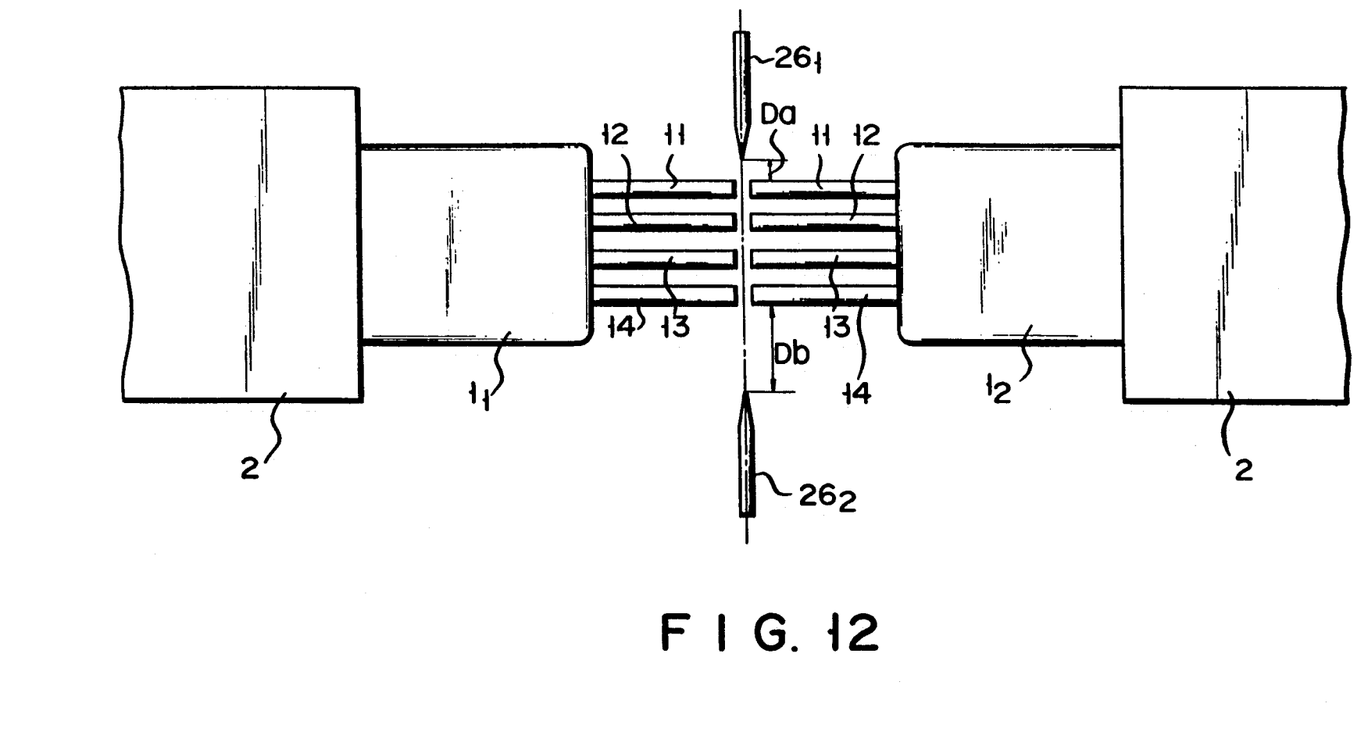
FIGS. 12 and 13 are views showing exposed fiber portions of a ribbon optical fiber before heating and after heating, respectively.
Figure 13:
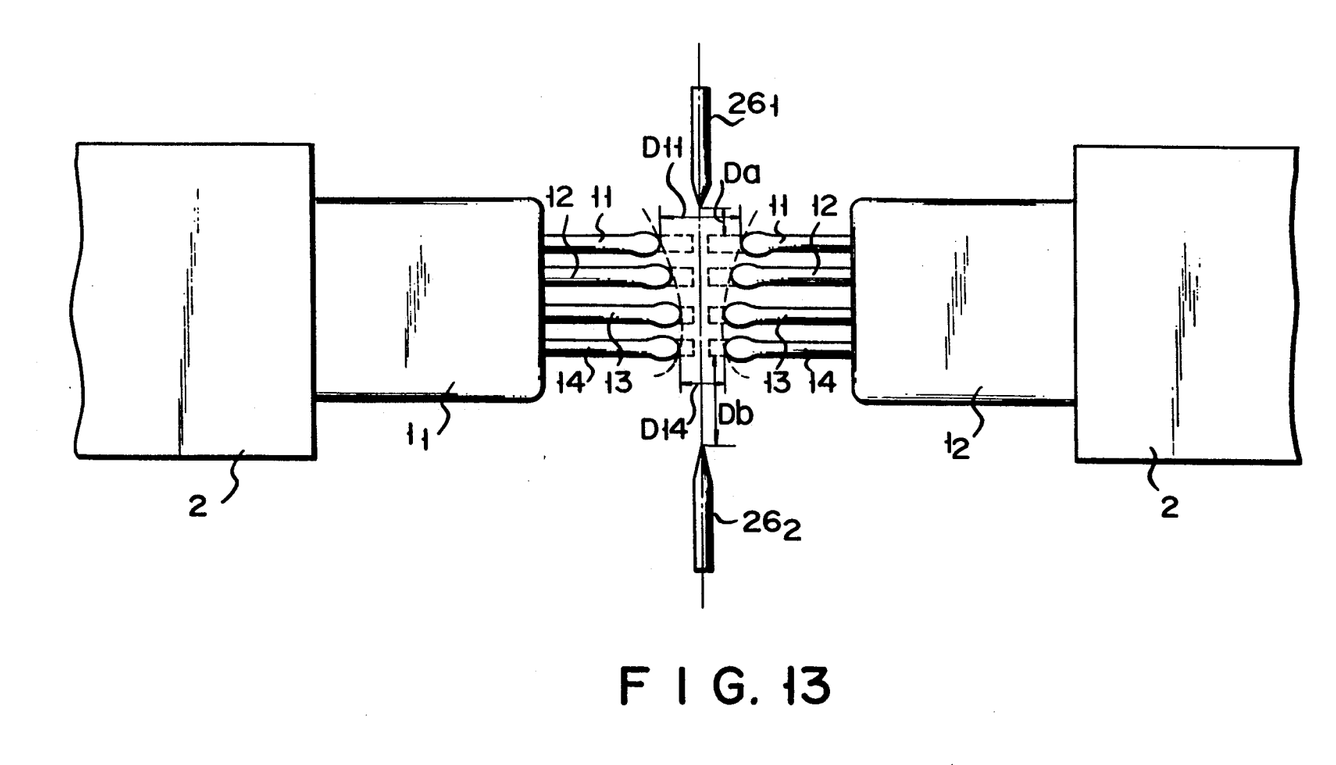

If, as shown in FIG. 12, discharge electrodes $26_1$ and $26_2$ are displaced such that the electrode $26_1$ is close to the outer fiber portion 11 of the optical fibers $1_1$ and $1_2$ and electrode $26_2$ is further from the outer fiber portion 14 of optical fibers $1_1$ and $1_2$, then the pattern of the ends of the exposed fiber portions is as shown in FIG. 13. The distance D11 between the ends of the outer fiber portions 11 of the optical fibers $1_1$ and $1_2$ is larger than the distance D14 between the ends of the outer fiber portions 14 of the optical fibers $1_1$ and $1_2$. In this case, the exposed fiber portions of the optical fibers $1_1$ and $1_2$ are moved so that the distance Da between the outer fiber portions 11 and the electrode $26_1$ equals the distance Db between the outer fiber portions 14 and the electrode $26_2$. Alternatively, the discharging electrodes $26_1$ and $26_2$ are moved so that the distance Da between the outer fiber portions 11 and the electrode $26_1$ equals the distance Db between the outer fiber portions 14 and the electrode $26_2$.

Figure 14:
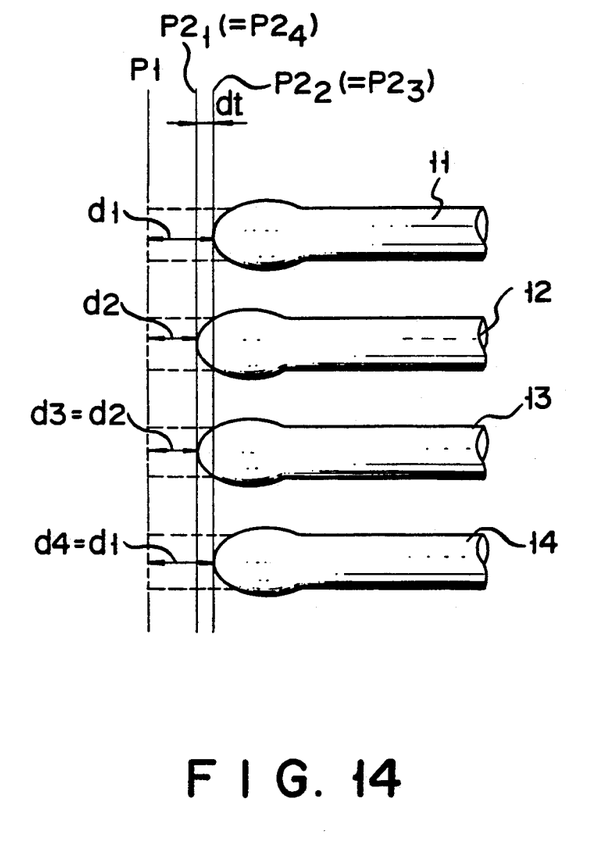
FIG. 14 is a view showing a pattern of ends of exposed fiber portions of a ribbon optical fiber after heating.

As shown in FIG. 14, distance d2 and d3 of the inner fiber portions 12 and 13 are preferably equal to each other and between 200 µm and 300 µm (200 µm<d2(=d3)<300 µm). Distance dt is preferably smaller than 100 µm (dt<100 µm). In practice, the strength of the arc applied to the ends of the exposed fiber portions is selected so that these distances have these values.

As described above, in the above embodiment, position P1 of the ends before heating, of the exposed fiber portions 11 to 14 and positions $P2_1$–$P2_4$ of the ends after heating are picked up, distances d1 to d4 are calculated based on position P1 and position $P2_1$ to $P2_4$, and quantities of heat applied to the ends of the exposed fiber portions are determined based on the distances and the heat characteristics of the fiber portions. Distances d1 to d4 correspond to quantities of heat applied to the ends of the exposed fiber portions 11 to 14. Therefore, according to the embodiment, quantities of heat applied to the ends of the exposed fiber portions can be quantitatively obtained and thus accurately measured. Furthermore, the quantities of heat can be easily measured.

In the above embodiment, by using microscope 23, TV camera 24, and TV monitor 25, distances d1, d2, d3, and d4 are measured on the screen of the monitor by picking up the positions P1 and $P2_1$–$P2_4$.

However, distances d1, d2, d3, and d4 can alternatively be measured with only a microscope by using a scale of the field of view.

In addition, images of the ends may be picked up by a TV camera and processed by an image processor to calculate the distance. Even when an image processor is used, it is only necessary to process data of distances between the ends of exposed fiber portions 11 to 14 before heating and those after heating. Information on the entire screen need not be processed and therefore, the apparatus can be simplified and made compact and would require only a short processing time.

Also in the above embodiment, a discharge arc is used as a heat source to fusion-splice the ends of exposed fiber portions. However, an oxyhydrogen flame, a carbon dioxide laser, or the like can also be used.

According to the above-mentioned method, quantities of heat applied to the ends of exposed fiber portions can be accurately and easily measured.

When an image pick-up device such as a TV camera and an image processor are used, automatic measurement can be performed within a short period of time. These devices can be easily used on a working site. If measured data are recorded, deterioration, by aging, of heat-strength and uniformity thereof can be easily checked. Furthermore, changes of heat-strength and uniformity thereof caused by variation in air pressure or ambient temperature can be easily checked.

Upon a change in altitude (atmospheric pressure) of a site in which a fusion-splicing apparatus is used, differences in melting points of exposed fiber portions, and changes in heat-strength owing to different outer diameters of the exposed fiber portions are detected and recorded, and an optimal discharge strength of the arc for fusion-splicing can be selected.

In particular, when the method of the present invention is applied in fusion-splicing of ribbon optical fibers, a plurality of spliced portions can made uniform and can have an equal strength.

Another embodiment will be described hereinafter. This embodiment refers to a single optical fiber.

FIGS. 15 to 18 correspond to FIGS. 3 to 6, respectively, and show a pair of optical fibers at respective steps of a fusion-splicing process.

Figure 15:
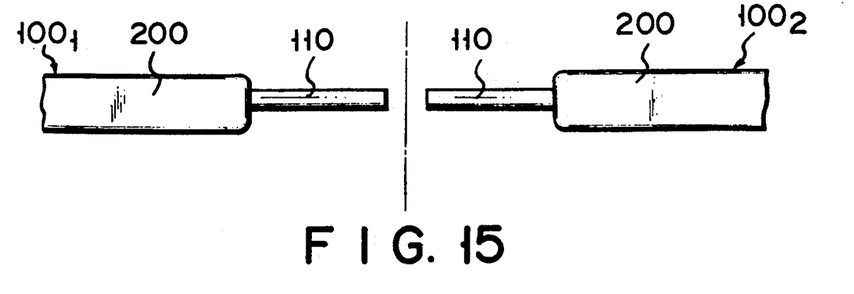
FIGS. 15 to 18 show a pair of optical fibers at respective steps for fusion-slicing the fibers, respectively.
Figure 16:
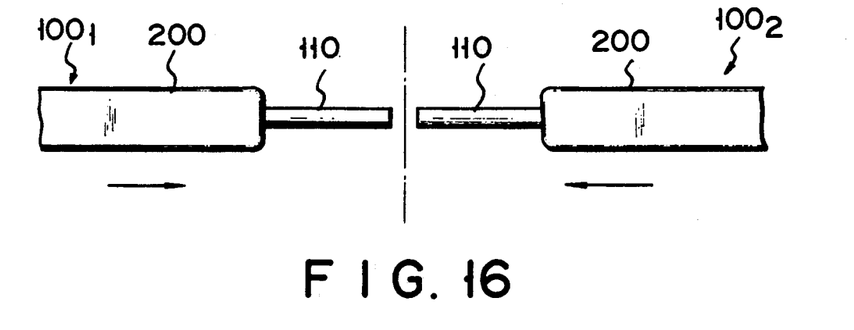
Figure 17:
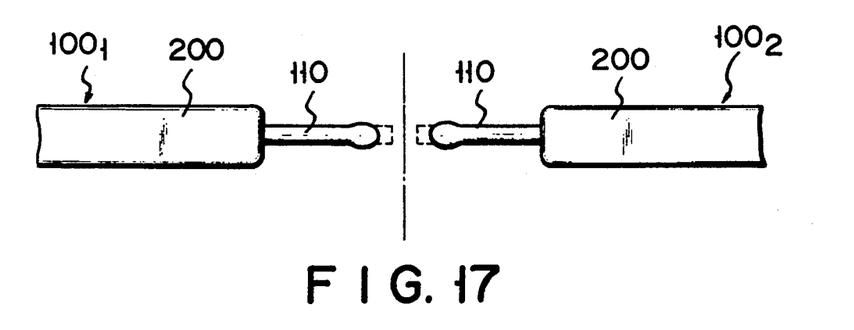
Figure 18:
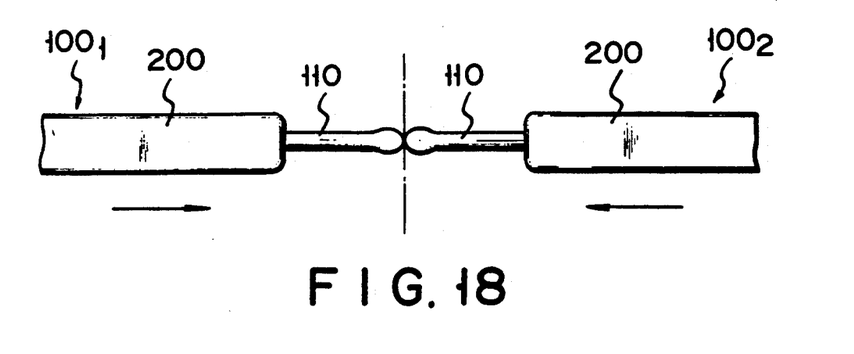

As shown in FIG. 15, exposed fiber portions 110 of optical fibers $100_1$ and $100_2$ are arranged in a line so that an end face of the exposed fiber portion of optical fiber $100_1$ is opposed to an end face of the exposed fiber portion of optical fiber $100_2$. Thereafter, as shown in FIG. 16, the optical fibers $100_1$ and $100_2$ are moved toward each other to set an initial distance between the exposed fiber portions 110 of the optical fibers $110_1$ and $110_2$, while monitoring the ends of the exposed fiber portions by a core monitoring method using a microscope, a TV camera, and a TV monitor. Next, the exposed fiber portions 110 are moved in x and y directions, while monitoring the ends of the exposed fiber portions also by the core monitoring method using the microscope, the TV camera, and the TV monitor, so that centering of the exposed fiber portions 110 are realized. Then, an arc is applied via discharge electrodes to the ends of the exposed fiber portions 110 to fuse the end face, as shown in FIG. 17. When the end faces of the exposed fiber portions 110 are fused, the exposed fiber portions are further moved toward each other so that the ends of the exposed fiber portions abut against each other (FIG. 18), while applying an arc to the ends of the exposed fiber portions. In this way, the optical fibers are fusion spliced.

Figure 19:
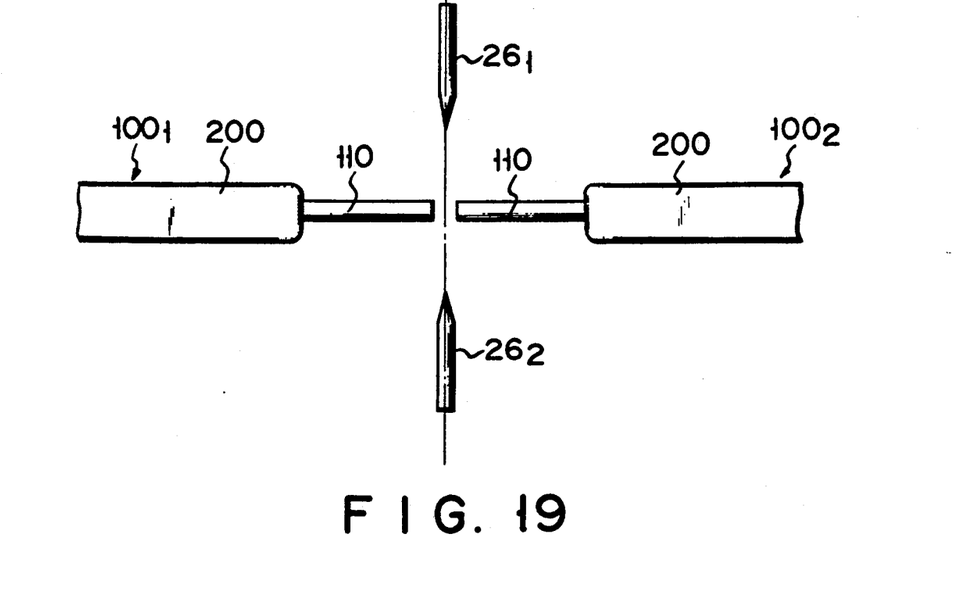
FIGS. 19 and 20 are views showing the ends of exposed fiber portions of optical fibers before heating and after heating, respectively.
Figure 20:
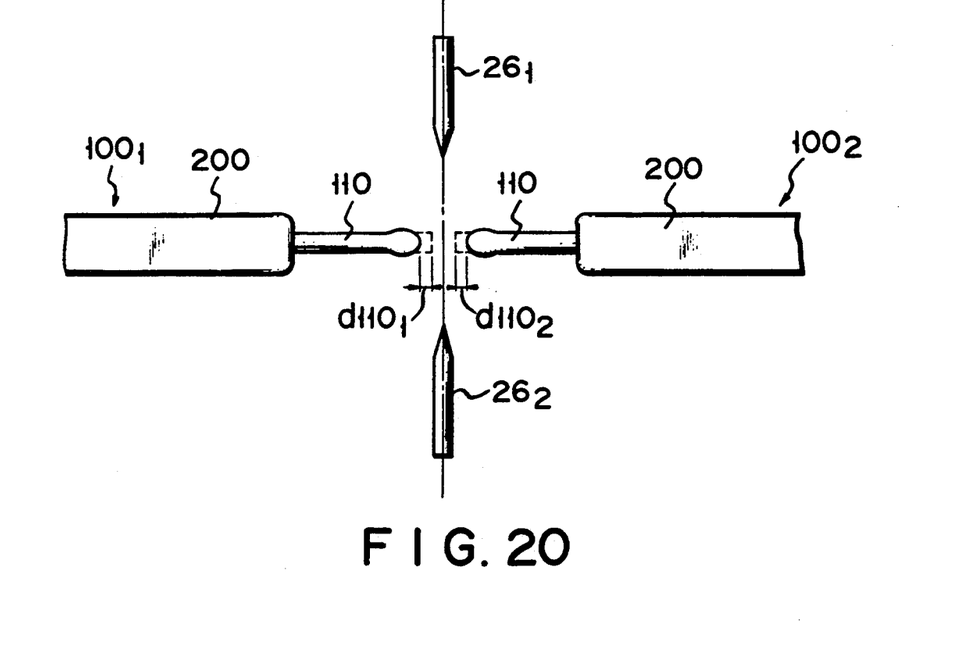

When discharging electrodes $26_1$ and $26_2$ are arranged at the predetermined positions with regard to the exposed fiber portions 110 of the optical fibers $100_1$ and $100_2$ as shown in FIG. 19 and an arc is applied to the ends of the exposed fiber portions to heat the end faces thereof, then the pattern of the ends of the exposed fiber portions 110 is as shown in FIG. 20. Distances $d110_1$ and $d110_2$ are substantially the same.

Figure 21:
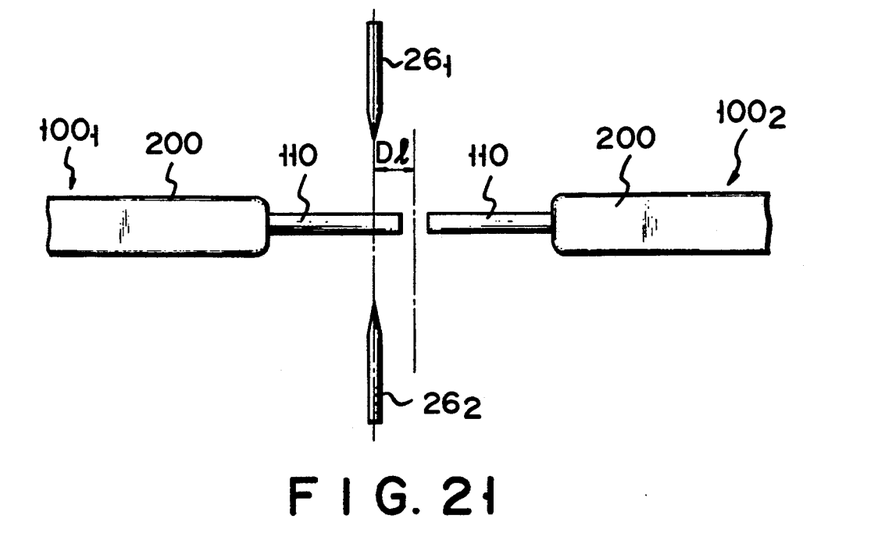
FIGS. 21 and 22 are views showing the ends of exposed fiber portions of optical fibers before heating and after heating, respectively.
Figure 22:
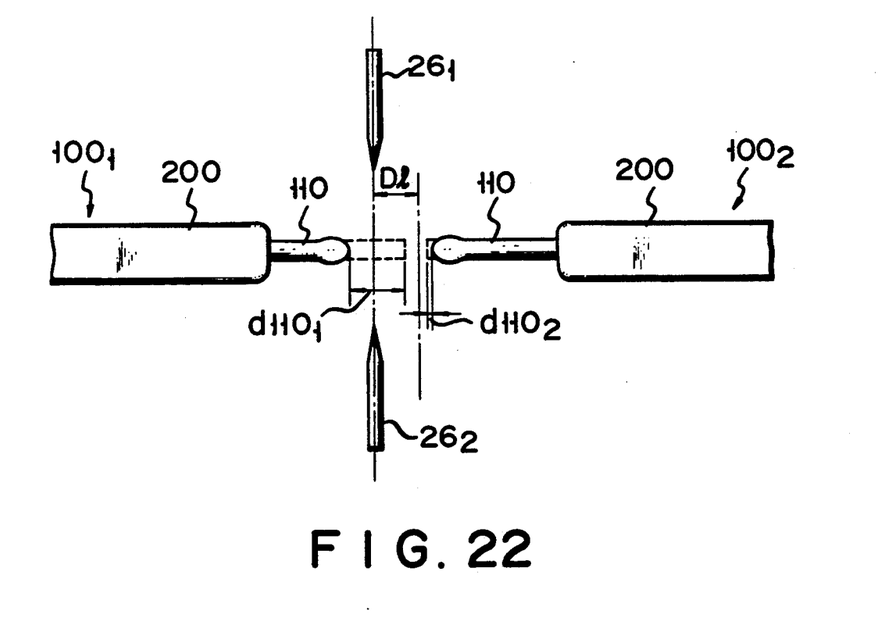

If, however, as shown in FIG. 21, discharging electrodes $26_1$ and $26_2$ are displaced from the predetermined positions by Dl closer to the exposed fiber portions 110 of the optical fiber $100_1$, then the arc is applied to the end of the exposed fiber portion 110 of the optical fiber $100_1$ more strongly than that of optical fiber $100_2$, and the end of the exposed fiber portion 110 of the optical fiber $100_1$ is melted more than that of optical fiber $100_2$. Therefore, the pattern of the ends of the exposed fiber portions 110 of the optical fibers $100_1$ and $100_2$ is as shown in FIG. 22. In this case, to make the distances $d110_1$ and $d110_2$ of the exposed fiber portions 110 of the optical fibers $100_1$ and $100_2$ equal to each other, discharging electrodes $26_1$ and $26_2$ are moved toward the exposed fiber portion 110 of the optical fiber $100_2$ so that the electrodes are arranged at the predetermined positions. Alternatively, the optical fibers $100_1$ and $100_2$ are moved so that the ends of the exposed fiber portions 110 of optical fibers $100_1$ and $100_2$ are arranged at the predetermined positions.

In the embodiment referring to a single optical fiber, since retraction amounts of the ends of the exposed fiber portions can be measured, the optimum quantity of heat applied to the ends of the exposed fiber portions can be properly selected even when the atmospheric pressure or ambient temperature changes. Furthermore, it can be determined, based on difference between the retraction amounts of the ends of the exposed fiber portions, whether or not the discharging electrodes are displaced from the predetermined positions in the direction of the fiber axis.

Even if the fiber axis is displaced from the center of the electrodes, that is, if one discharging electrode is closer to the exposed fiber portions and the other discharging electrode is further from the exposed fiber portions, then it will be unnecessary to correct the displacement, provided that the retraction amounts of the exposed fiber portions are in a predetermined range.

What is claimed is:

1. A method of measuring a quantity of heat applied to an end of each of exposed fiber portions of a ribbon optical fiber, comprising the steps of:

measuring a distance between an end of each of the exposed fiber portions of a ribbon optical fiber before heating and the end of each of the exposed fiber portions after heating, which comprises the steps of, picking up a first position of said end, before heating, of each exposed fiber portion of said optical fiber;

picking up a second position of said end, after heating, of each exposed fiber portion of said optical fiber; and determining said distance by subtracting said second position from said first position; and determining a quantity of heat applied to the end of each of said exposed fiber portions based on said measured distance, by using a heat characteristic of the ribbon optical fiber, said heat characteristic indicating a relationship between a quantity of heat applied to the end of each of the exposed fiber portions and an amount of retraction of the end of each of the exposed fiber portions.

2. A method for measuring a quantity of heat, according to claim 1, in which said determining step is carried out based on said measured distance or distances and a heat characteristic or characteristics of said exposed fiber portion or portions.

3. A method for measuring a quantity of heat, according to claim 1, in which said measuring step is carried out using a microscope.

4. A method for measuring a quantity of heat, according to claim 1, in which said measuring step is carried out using a microscope, a camera, and a monitor.

5. A method of measuring a quantity of heat applied to an end of each of exposed fiber portions of each of a pair of ribbon optical fibers arranged in a line, comprising the steps of:

measuring a distance between an end of each of exposed fiber portions, before heating, of each of a pair of optical fibers arranged in a line and the end of each of the exposed fiber portions after heating, which comprises the steps of, picking up a first position of said end, before heating, of each of the exposed fiber portions of said each optical fiber;

picking up a second position of said end, after heating, of each of the exposed fiber portions of said each optical fiber; and determining said distance by subtracting said second position from said first position; and determining a quantity of heat applied to said end of each of the exposed fiber portions of each of said optical fibers based on said measured distance, by using a heat characteristic of the ribbon optical fibers, said heat characteristic indicating a relationship between a quantity of heat applied to the end of each of the exposed fiber portions and an amount of retraction of the end of each of the exposed fiber portions.

6. A method for measuring a quantity of heat, according to claim 5, in which said determining step is carried out based on said measured distance or distances and a heat characteristic or characteristics of said exposed fiber portion or portions.

7. A method for measuring a quantity of heat, according to claim 5, in which said measuring step is carried out using a microscope.

8. A method for measuring a quantity of heat, according to claim 5, in which said measuring step is carried out using a microscope, a camera, and a monitor.

9. A method of fusion-splicing ribbon optical fibers, comprising the steps of:

arranging in a line a pair of ribbon optical fibers each including a plurality of exposed fiber portions;

detecting an end of each of the exposed fiber portions of each of a ribbon optical fibers before heating;

heating the end of each of the exposed fiber portions by applying arc energy through a pair of discharge electrodes;

detecting the end of each of the exposed fiber portions after said heating step;

measuring a distance between the end of each of the exposed fiber portions before heating and the end of each of the exposed fiber portions after heating, which comprises the steps of, picking up a first position of said end, before heating, of each of the exposed fiber portions of said each optical fiber;

picking up a second position of said end, after heating, of each of the exposed fiber portions of said each optical fiber, and determining said distance by subtracting said second position from said first position;

determining a quantity of heat applied to the end of each of said exposed fiber portions based on said measured distance, by using a heat characteristic of the ribbon optical fiber said heat characteristic indicating a relationship between a quantity of heat applied to the end of each of the exposed fiber portions and an amount of retraction of the end of each of the exposed fiber portions; and setting positions of said discharge electrodes so that the measured distances between said ends of the optical fiber portions are substantially uniform.

* * * * *

UNITED STATES PATENT AND TRADEMARK OFFICE
CERTIFICATE OF CORRECTION

PATENT NO. : 5,009,513
DATED : April 23, 1991
INVENTOR(S) : ONODERA et al It is certified that error appears in the above-identified patent and that said Letters Patent is hereby corrected as shown below:

TITLE PAGE:

Item [56] References Cited, insert the following:

Under "U.S. PATENT DOCUMENTS" -

4,316,387   2/1982   Hughes........ 374/32

Item [56] "OTHER REFERENCES" -

"A Fully Automatic Optical Fiber AFC-Fusion Splice Machine", T. Haibara et al (Members), 2334 - Transactions of IECE of Japan, Vol. E68, No.12, Dec. 1985, pages 836-842.

Signed and Sealed this

Twenty-ninth Day of December, 1992

*Attest:*

DOUGLAS B. COMER

*Attesting Officer*     Acting Commissioner of Patents and Trademarks